UNITED STATES PATENT OFFICE.

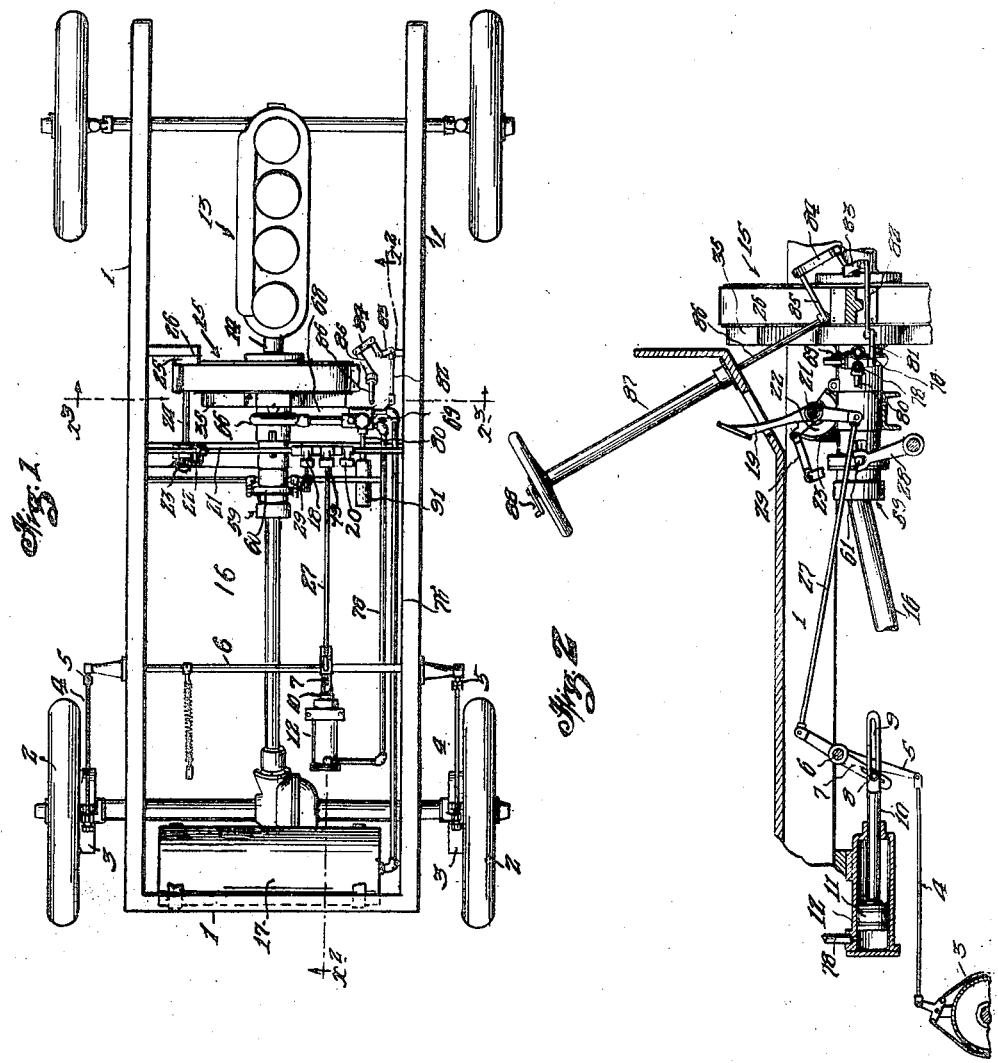

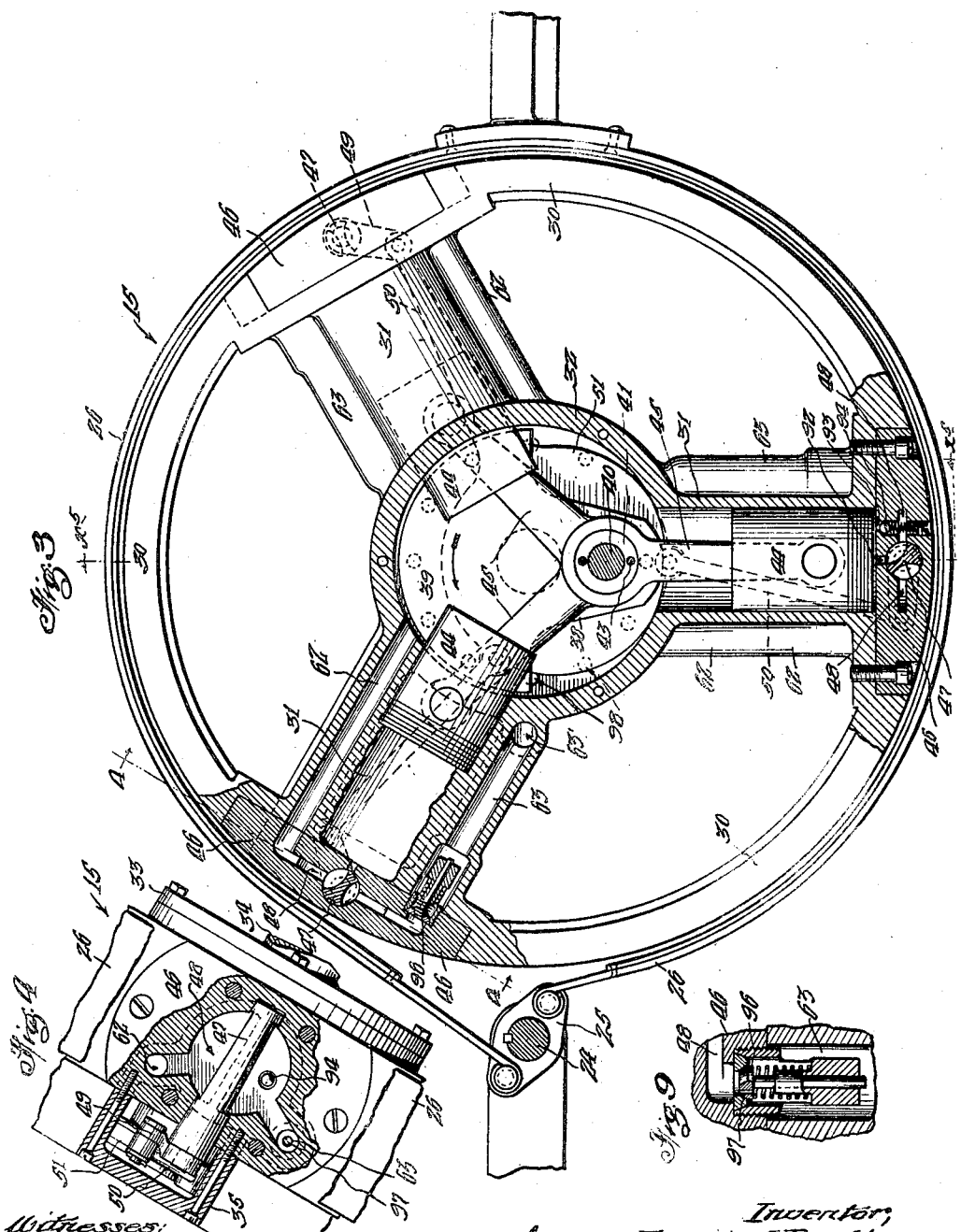

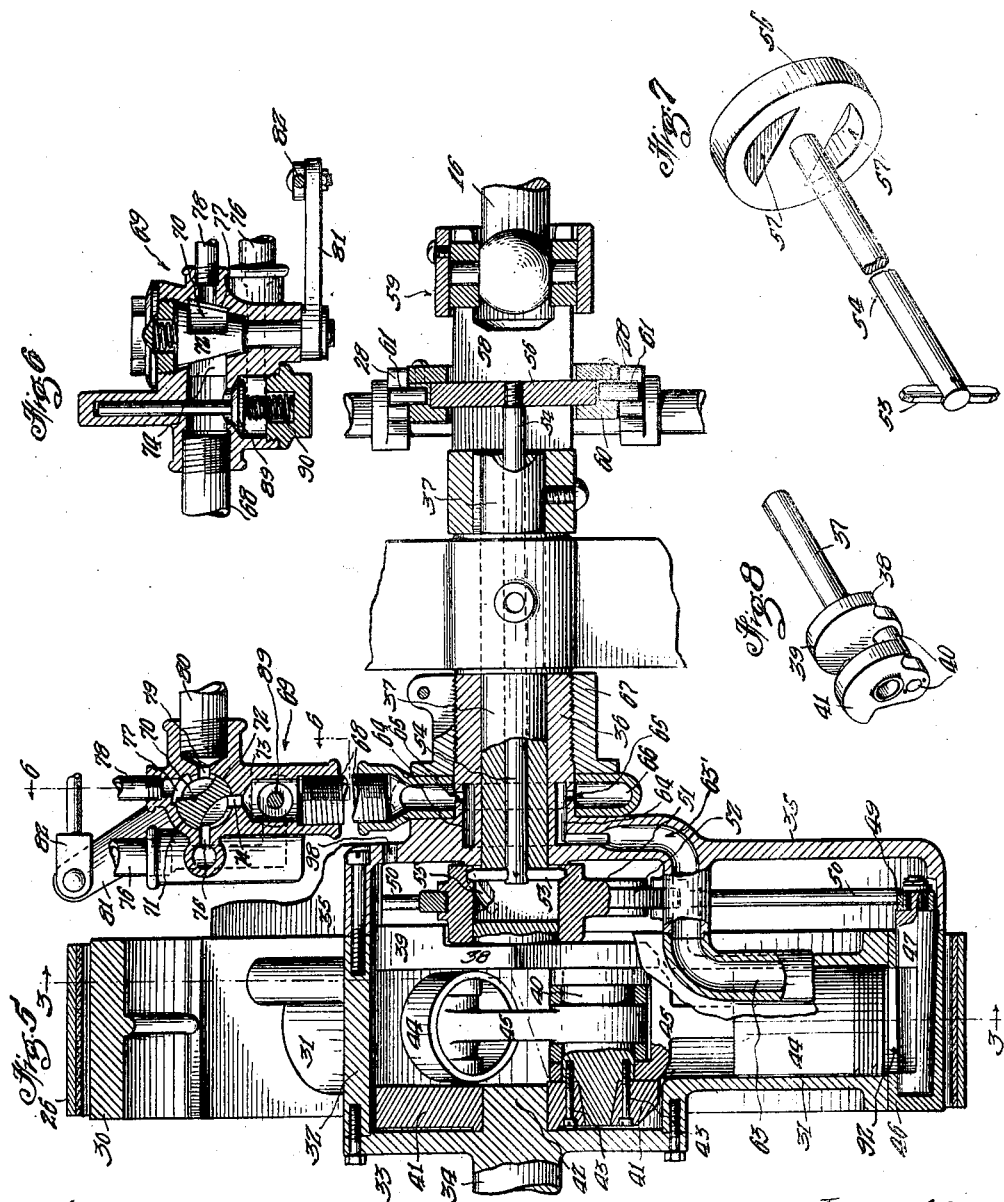

FRANK MONROE PRATHER, OF LOS ANGELES, CALIFORNIA.

PNEUMATIC POWER TRANSMISSION.

1,036,334.  Specification of Letters Patent.  Patented Aug. 20, 1912.

Application filed April 12, 1911. Serial No. 620,692.

*To all whom it may concern:*

Be it known that I, FRANK M. PRATHER, a citizen of the United States, residing at Los Angeles, in the county of Los Angeles and State of California, have invented new and useful Improvements in Pneumatic Power Transmission, of which the following is a specification.

This invention relates to pneumatic power transmission wherein a series of radial cylinders are connected to the driving shaft, pistons within the cylinders connected to the driven shaft, and valve mechanism for controlling the air passages of the cylinders, whereby the device may be used as a clutch to operate the driven shaft from the driving shaft, or with the driven shaft stationary the device may be operated as a motor to turn the driving shaft to start the motor.

In my previous patent the air circulation was controlled by rock valves and if such valves were turned slowly in reversing, such that the valves would prevent the exhaust of the air from the cylinder during the compression stroke of the piston, the high compression would produce breakage, and one of the main objects of the present invention is to avoid this by providing a check valve which will permit air, if the pressure becomes excessive, to pass out of the cylinder and into the storage tank.

Another object is to provide a manually operated air valve which may be adjusted to produce the following functions:

(*a*) When in one position to permit air to circulate freely through the cylinder and air passages without being compressed or exerting any action on the parts of the device, this function permitting the driving shaft to rotate freely with respect to the driven shaft, or the driven shaft to rotate freely with respect to the driving shaft, neither shaft being retarded and no air being compressed.

(*b*) When in another position causing air to be compressed in the cylinders, and if pressure in the storage tank is below normal compression the supply of air in the tank will be replenished until its pressure is raised to normal, and if pressure in the tank is at normal, as the compression of air in the cylinders proceeds, compressed air accumulates in a column against the valve until the compression is so great that the resistance of the compressed air is sufficient to cause the cylinders and driven shaft to rotate together.

(*c*) With the valve in another position, and the car standing still, air may pass from the tank through the valve to the cylinders to cause them to rotate and turn the driving shaft and thereby start the motor, the reversing lever having first been adjusted to reverse the cylinder valves so that the direction of rotation will be correct for starting the motor, the reversing valves being restored to normal position after the motor has been started.

(*d*) With the valve in the same position as in (*c*), to provide means for preventing rotation of the cylinders which will result in actuating the pistons by air from the storage tank, thus driving the car ahead under air pressure. This operation makes it possible to release the cylinders and permit them to rotate, after the car has enough headway, whereupon the engine being stationary will retard the cylinders and the moving car will actuate the pistons in the cylinders, and with control valve in clutching position air will be compressed until sufficient to overcome the inertia of the stationary motor, whereupon the latter is rotated and thus started.

(*e*) By preventing the cylinders from rotating, the motor is kept from revolving, whereupon by turning the valve to admit air to the cylinders the pistons will be actuated to operate the driven shaft and propel the car by means of compressed air for a distance determined by the capacity of the storage tank. This enables the car to be moved a short distance in an emergency, such, for example, as moving the car off railroad tracks, if the motor has been stalled, or moving the car out of heavy traffic to the curb when the motor has become disabled for any reason.

(*f*) To carry out the function (*e*) by propelling the car in the reverse direction by reversing the lever.

(*g*) With car running backward on compressed air, by releasing the cylinders and permitting them to rotate, the motor will be started in the proper direction.

(*h*) By placing the lever in another position it releases the air and the car is free to coast, and by continuing the movement of the lever air from the storage tank will be permitted to pass to the brake cylinder and apply the air brakes, and by turning the lever back slightly from this position sufficiently to shut off the supply of air from the tank to the brake cylinder, the air is held in brake cylinder and a further movement of the lever brings the brake cylinder in communication with the atmosphere and permitted to exhaust, thus releasing the brake. Thus by alternately moving the lever between these points, the brake cylinder may be intermittently filled with air held under pressure or exhausted, thus alternately applying and releasing the brakes and bringing the car to a gradual stop without locking the wheels.

($i$) If in descending a very steep or long grade, and it is desired to save the regular brakes of the car or to supplement them, the reverse lever may be operated and the band brake applied to prevent the cylinder from rotating, thus killing the engine. The lever is moved nearly into clutching position thereby compressing air in the cylinders and retarding the car correspondingly. If the lever were to be moved into full clutching position, the car would be positively stopped by the successive compression of air, and for this reason the lever should not be moved to entirely close the valve, so that enough air will be allowed to escape from the cylinders to the atmosphere and still produce sufficient compression to retard the car the desired amount. During this operation the reverse valve must be operated to reverse position, otherwise the circuit of air during the pumping action of the cylinders and pistons would be to draw a vacuum at the controlling valve which would not be as efficient as compressing the air.

($j$) Another object is to employ check valves in the end of the cylinders, in conjunction with the rocking valves, which will enable higher compression to be produced than with the rocking valves alone, such check valves being provided with a perforation large enough to furnish air required for those operations wherein the air passes in a reverse circuit through the check valves.

Referring to the drawings:—Figure 1 is a plan view of an automobile equipped with the mechanism forming my invention. Fig. 2 is a sectional view on line $x^2$—$x^2$ Fig. 1, the view being on an enlarged scale. Fig. 3 is a sectional view on line $x^3$—$x^3$ Fig. 1, on an enlarged scale. Fig. 4 is a section on line $x^4$—$x^4$ Fig. 3. Fig. 5 is a section on line $x^5$—$x^5$ Fig. 3. Fig. 6 is a section on line $x^6$—$x^6$ Fig. 5. Fig. 7 is a perspective of the sliding element for operating the eccentric. Fig. 8 is a perspective on a reduced scale, of the driven shaft. Fig. 9 is a sectional view through a check valve.

Referring to Fig. 1, 1 designates an automobile frame with driving wheels 2 and brakes 3 on the driving wheels connected by rods 4 with arms 5 projecting from a rock shaft 6. On the rock shaft 6 is an arm 7 with a pin 8 which engages in a slot 9 formed in a piston rod 10 which is operated by a piston 11 in a brake cylinder 12. 13 is the motor with driving shaft 14. 15 designates the pneumatic power transmitter, 16 the driven shaft and 17 the storage tank for compressed air. 18 designates a pedal for operating the reverse mechanism, 19 a pedal for operating the brakes 3 and 20 a pedal for operating a rock shaft 21 which carries a segmental bevel gear 22 meshing with a bevel gear 23 on a shaft 24, the shaft 24 having a double arm 25 to both ends of which is connected a brake band 26 which encircles the cylinder member 15 of the pneumatic power transmitter as clearly shown in Fig. 3, so that when the pedal 20 is operated brake band 26 will prevent rotation of the cylinder member 15 of the pneumatic transmitter. When the pedal 19 is operated it pushes the rod 27 rearwardly which moves arm 7 forwardly, pin 8 traveling freely forward in the slot 9 and in slotted arm 7, and shaft 6 is thus rocked which moves forward arms 5 and draws rods 4, thus operating brakes 3. When pedal 18 is operated it actuates a forked arm 28 through the medium of a link 29, and the forked arm 28 operates a reversing device which will be described.

The pneumatic power transmitter comprises in the present embodiment a fly-wheel 30 which is formed with three cylinders 31 and with a central circular crank chamber 32 to which is attached a disk 33 on the end of a driving shaft 34. Secured to the other side of the crank chamber 32 is a cap 35 which is formed with a hub 36 in which is mounted one end of the driven shaft 37, on the end of which is a crank 38 with counterbalance 39, the crank 38 being connected by a crank pin 40 with a crank 41 journaled on a boss 42 projecting from the end of the driving shaft 34 and also provided with a counterbalance, the crank 41 being detachably secured to the crank pin 40 by screws 43. Sliding in the cylinders 31 are trunk pistons 44, each of which has a connecting rod 45 which is connected with the crank pin 40. Inserted in the fly-wheel 30 and flush therewith at the end of each cylinder is a plate 46, each of which has a rock valve 47 and is provided with a valve chamber 48, as clearly shown in Fig. 4, each valve 47 having an arm 49 which is connected with a rod 50. Mounted on the driven shaft 37 is an eccentric 51 and an eccentric strap 52 with which the rods 50 are pivotally connected, so that as the eccentric is operated by the shaft 37 the rock valves 47 will be oscillated through their connections with the eccentric. As in certain functions the valves 47 are to be reversed, I provide a mechanism for reversing the eccentric 51. This consists of a pin 53 in the end of a rod 54, the latter being slidable in the center of the driven shaft 37, the pin 53 engaging spiral grooves 55 formed in the hub of the eccentric 51, so that when the rod 54 is moved longitudinally, the pin 53 sliding in the grooves 55 will turn the eccentric 51 and reverse the position of the valves 47. The rod 54 is operated by disk 56, shown in detail in Fig. 7, to which the rod 54 is attached, the disk 56 having two openings 57 which slidably engage bars 58 of a universal joint 59 which prevents the disk 56 from turning with respect to the shaft 37. A grooved collar 60 engages the rim of the disk 56, and pins 61 which project into the grooved collar are engaged by arms 28 before referred to. The crank chamber 32 is airtight, thus forming an air chamber, and extending along the side of each cylinder 31 is an air passage, the inner end of which communicates with the interior of the crank chamber 32, the outer end of each air passage 62 communicating with the valve chamber 48. On the other side of each cylinder is an air passage 63, the inner end of which joins an air passage 63′ formed in the cap 35, as clearly shown in Fig. 5, the passage 63′ communicating with an annular chamber 64 formed in the cap 35 and having ports 65 which extend from the chamber 64 to a hollow ring 66 which encircles the hub 36, and the ring 66 is held in position by a collar 67 which is screwed on the hub 36.

Extending from the hollow ring 66 is a pipe 68 which, as clearly shown in Figs. 1 and 5, leads to a controlling valve designated in general 69. The controlling valve 69 contains a revoluble valve 70 with a wide face 71 and a narrow face 72. The valve casing 73 is provided with a port 74 leading to the pipe 68, a port 75 leading to pipe 76, a port 77 leading to a pipe 78 and a port 79 leading to a pipe 80. The valve 70 is operated by an arm 81 which is connected by a link 82 with a bell-crank lever 83 which in turn is connected by a link 84 with an arm 85 on the lower end of a rod 86 which extends along the steering column 87 and is operated by a lever 88 at its upper end, as shown in Fig. 2. Also in the casing 73 is a check valve 89, as shown in Fig. 6, which is normally closed by a spring 90, the latter closing communication between the pipe 76 and pipe 68. As shown in Fig. 1, the pipe 80 which leads to atmosphere is provided on its end with a perforated drum 91 which acts as a muffler for the escaping air, preventing any objectionable noise. The pipe 76 leads to the storage tank 17 and the pipe 78 leads to the brake cylinder 12.

In each plate 46 is a port 92 which leads from the valve 47 to the cylinder, and a port 93 is arranged between the cylinder and valve chamber 48 which is normally closed by a spring pressed ball valve 94. The function of the valve 94 is to prevent excessive compression in the cylinder which might be caused by careless operation of the device under certain conditions; thus with the car standing still, and the motor running fast, if the operator should shift the cylinder valves 47 into reverse position, and should be slow in doing it, as the thinner face of the valve passed across the port 93 it would completely close that port, and if the port remained closed for too long a period during the compression stroke of the piston, the air would be compressed to such a high point that breakage or accident would occur. This would be obviated, however, for when the pressure rose high enough to overcome the valve 94 the latter would open, thus placing port 93 in communication with valve chamber 48 and air would then pass from the cylinder through port 93 to valve chamber 48 and thence through passage 63 and other connections to the storage tank. It should be understood that in the normal operation of the device the valves 47 are shifted by the regular rotations of the eccentric at a time when the pistons are at the inner ends of their stroke, so that there is no excess of pressure within the cylinders at the time the valves 47 are closed.

As shown in Fig. 3, a check valve 96 is arranged between the passage 63 and valve chamber 48. This traps the air which is compressed by the cylinders and forced into the passages 63 and enables a higher compression to be produced than if the rock valves 47 were depended upon entirely. Each check valve 96 has a perforation 97 which is large enough to permit the requisite amount of air to pass reversely from valve passage 63 to valve chamber 48 when the air is to take the reverse circuit for performing certain operations. It should be noted that although the check valves permit a reverse circulation of air that rock valves 47 form positive closures and control the movement of air when the device is acting as a compressor or as a motor. The check valves 96 are merely auxiliary and enable a somewhat higher compression to be accomplished. Air is allowed to enter the crank case 32 through perforations 98 in the cap 35, which perforations act as a muffler when the air passes in the opposite direction therethrough in exhausting the atmosphere.

The various functions of the device are performed as follows:

(a) When controlling valve 70 turns so that ports 74 and 80 are in communication, air will circulate freely from the cylinders through the passages 63, 62, ring 66 and pipe 68, through ports 74 and 79 to pipe 80, to muffler 91 and atmosphere, so that if the motor should be running and the driving shaft 34 revolving, the cylinders would revolve with the driving shaft, but the pistons would idly reciprocate in the cylinders because the air would circulate freely through the before described connections and the driven shaft would not be operated.

(b) When the face 72 of valve 70 is turned to close the port 74, it prevents air from the cylinders passing to the atmosphere and causes it to be compressed in the cylinders, assuming that the driving shaft and cylinders are revolving, and the air thus compressed is forced through port 92 in the end of the cylinder to valve chamber 48 and overcoming check valve 96 enters passage 63, thence flows through annular chamber 64, through ports 65 into hollow rings 66, and through hollow rings 66 and through pipe 68 and overcomes check valve 89, and thence passes through pipe 76 to the storage tank 17 until the pressure in tank 17 is raised to normal when check valve 89 closes and continued operation of the pistons compresses air in the cylinders and forcing it past check valve 96 into passage 63 causes it to accumulate in a column against the valve, the face 72 of which closes the port 74, and when the compression of air in this column is sufficiently great it locks the pistons from further reciprocation and causes them and the driven shaft to revolve in unison with the driving shaft 34.

(c) If valve 70 is placed in the position shown in Fig. 5, and the car is standing still, compressed air will pass from storage tank 17 through pipe 76, through port 75 to port 74, to pipe 68 and thence through the rings 66 and passage 63 to check valves 96, through the perforations thereof to valve chambers 48 and through ports 92 it enters the cylinders, and the pistons being held against movement by the stationary car produces a reaction on the cylinders causing the cylinders to turn, thus revolving the shaft 34 and starting the motor. To cause the motor to be thus revolved in proper direction, it is essential that the valves 47 be moved to reverse position, which is accomplished by shifting the eccentric 51 through its controlling mechanism previously described. As soon as the motor is started the eccentric may be shifted to normal position, thus restoring the valves 47 to normal position.

(d) Another method of starting the motor is as follows: With the controlling valve 70 in the same position as just described, that is, in the position shown in Fig. 5, by applying the band brake 26 to the fly-wheel the cylinders will be prevented from rotation, and compressed air which enters will act upon the pistons to propel the car itself forward under compressed air, the motor standing stationary by reason of the cylinders 31 being held by the band brake 26, and when the moving car has sufficient momentum the band brake may be released, whereupon the engine, which is at that time not rotating, holds the cylinders 31 from rotation and the moving car actuates the pistons in the stationary cylinders 31, and by then moving the controlling valve 70 to clutching position, that is, with its face 72 closing port 74, air will be compressed in the cylinders to a sufficient pressure to overcome the resistance of the cylinders 31 which are held from rotation by the inert engine, whereupon the cylinders 31 are rotated and the engine started.

(e) If it is desired to propel the car under air without starting the engine, the band brake 26 is tightened which prevents rotation of the cylinders 31 and motor, and by turning valve 70 into the position shown in Fig. 5 air is admitted from the storage tank to the cylinders and acting upon the pistons rotates the driving shaft 37, thus moving the car ahead. It should be understood that when the air moves in this reverse circuit that the perforations 97 in the check valves 96 are sufficiently large to permit the passage of the requisite amount of air in the reverse direction, i. e., from passages 63 to valve chambers 48, thence through ports 92 into the cylinders. This ability to utilize the pneumatic power transmitter in the capacity of an air motor to propel the car is of great advantage in many emergencies, as, for instance, if the regular motor should become stalled by accident or supply of fuel running out, it being possible to move the automobile off railway tracks to a safe position, or out of congested traffic.

(f) In the foregoing described operation the car will be propelled under compressed air in a forward direction. Obviously, if it be desired to run the car backward under compressed air, the reverse lever may be operated which will reverse the eccentric 51 and reverse the operation of the valves 47, thereby causing the driven shaft 37 to operate reversely and drive the car backward.

(g) With the car running backward under compressed air, as just described, when sufficient momentum has been obtained the band brake 26 may be loosened, whereupon the air which is compressed against the pistons will act against the cylinders and start the motor to running in a forward direction.

(h) By moving the valve 70 to bring its face 72 to the left of port 74, as shown in Fig. 5, the port 74 will thereby be placed in communication with atmosphere through pipe 80 which will allow the car to coast freely, and by continuing this movement of the valve its wide face 71 will be moved to the right of port 77, thus placing port 75 in communication with port 77 which allows air from the storage tank to pass through the pipe 78 to the brake cylinder 12 which moves the piston 11 forward and operates the brakes 3. Then by turning the valve 70 back slightly, or enough to shut off the air from the storage tank, the brake cylinder will be placed in communication with the atmosphere as ports 77 will then be in communication with port 79 and air from the brake cylinder will thus pass to atmosphere through these ports and pipe 80, which will cause the brake 3 to be released.

(*i*) It is often desirable to supplement the brake effect produced by the regular brakes of the car, or to check the movement of the car without using the regular brakes, and to thereby save wear on the latter, this being particularly desirable when descending a very steep or long grade, and this may be accomplished by applying the band brake 26, not to merely frictionally guard the rotation of the cylinders, but to actually stop them, thus killing the engine, and to then operate the reverse lever to shift the eccentric 51. Then by moving the controlling lever 70 to clutching position, that is, with its face 72 closing the port 74, as the cylinders are held stationary and the car is moving ahead, the pistons will be reciprocated in the stationary cylinders, thus compressing the air in a column against the closed valve 70. It is apparent, however, that the compression of air would soon be so great as to positively lock the pistons against further movement and thus stop the car altogether if the valve 70 were not operated occasionally to permit some air to escape to atmosphere through pipe 80 or preferably by adjusting the valve 70 to a point such that the compression will be sufficient to retard the car to the speed desired. If the reverse lever was not operated as above mentioned, the circuit of air produced by the moving pistons would have the effect of drawing a vacuum at the valve 70 which would not be so effective as the compression of air for this purpose.

What I claim is:—

1. A driving member, a driven member, cylinders connected with one of said members, pistons in the cylinders and connected with the other member, means including valves for controlling the circulation of air through the cylinders, a storage chamber and check valves opening only upon excessive pressure in the cylinders to place the cylinders in communication with the storage tank.

2. A driving member, a driven member, cylinders connected with one of said members, pistons in the cylinders and connected with the other member, means including valves for controlling the circulation of air through the cylinders, check valves in the ends of the cylinders normally closed during compression and opening only upon excessive pressure in the cylinders, a tank for holding air compressed in the cylinders, and means for conducting air which escapes from the check valves to said tank.

3. A driving member, a driven member, cylinders connected with one of said members, pistons in the cylinders and connected with the other member, means including valves for controlling the circulation of air in the cylinders, a tank in communication with said valves, a fly wheel carrying said cylinders, and a brake band on the fly wheel.

4. A driving member, a driven member, cylinders connected with one of said members, pistons in the cylinders and connected with the other member, means including valves for controlling the circulation of air in the cylinders, a tank in communication with said valves, and a brake for controlling the rotation of the cylinders.

5. A driving member, a driven member, cylinders connected with one of said members, pistons in the cylinders and connected with the other member, means including valves for controlling the circulation of air in the cylinders, a storage tank, a controlling valve communicating with the respective cylinders and storage tank and atmosphere, said controlling valve having ports and adjustable to place the cylinders in communication with the storage tank, or the cylinders in communication with the atmosphere, or shut off the foregoing cylinder communication, and mechanical means for preventing rotation of the cylinders.

6. A driving member, a driven member, cylinders connected with one of said members, pistons in the cylinders and connected with the other member, means including valves for controlling the circulation of air in the cylinders, a storage tank, a controlling valve communicating with the respective cylinders and storage tank and atmosphere, said controlling valve having ports and adjustable to place the cylinders in communication with the storage tank, or the cylinders in communication with the atmosphere, or shut off the foregoing cylinder communication, and a check valve permitting circulation of air in both directions between the said controlling valve and cylinders.

7. A driving shaft, a driven shaft, two crank arms connected by a crank pin secured on the end of the driven shaft, one of said crank arms having a journal fitted on the driving shaft, whereby the crank is supported and the two shafts are held in alinement, cylinders carried by the driving shaft, pistons within the cylinders connected to the driven shaft, rock valves in the heads of the cylinders, the wall of each cylinder having a passageway 62, 63 on each side thereof, both leading to said rock valve, one of said passages 62 being open to atmosphere at the inner end of the cylinder, a sleeve on the driven shaft having an annular passage, and conduits leading from said annular passage to the passages 63.

8. A driving shaft, a driven shaft, two crank arms connected by a crank pin secured on the end of the driven shaft, one of said crank arms having a journal fitted on the driving shaft, whereby the crank is supported and the two shafts are held in alinement, cylinders carried by the driving shaft, pistons within the cylinders connected to the driven shaft, rock valves in the heads of the cylinders, the wall of each cylinder having a passageway 62, 63 on each side thereof, both leading to said rock valve, one of said passages 62 being open to atmosphere at the inner end of the cylinder, a sleeve on the driven shaft having an annular passage, conduits leading from said annular passage to the passages 63, and check valves in the passages 63 permitting a ready circulation toward the annular passage and having ports 97 allowing a restricted circulation in the opposite direction.

9. A driving shaft, a driven shaft, cylinders carried by one of said shafts, pistons in the cylinders connected to the other shaft, valves in the ends of the cylinders for controlling the circulation of air in the cylinders, an eccentric on the driven shaft, connections from said eccentric to the respective valves, said eccentric having rifle grooves, a rod slidable in the driven shaft, a pin in said rod engaging a rifle groove, and means for sliding said rod to shift the eccentric relative to the driven shaft.

10. A driving shaft, a driven shaft, cylinders carried by one of said shafts, pistons in the cylinders connected to the other shaft, valves in the ends of the cylinders for controlling the circulation of air in the cylinders, an eccentric on the driven shaft, connections from said eccentric to the respective valves, said eccentric having rifle grooves, a rod slidable in the driven shaft, a pin in said rod engaging a rifle groove, the driven shaft having a slot, a ring slidable on the driven shaft and having a diametrical bridge which slides in said slot, the end of said rod being connected to said bridge, a sleeve revolubly engaging said ring, and lever mechanism for shifting said sleeve.

11. A driving shaft, a driven shaft, cylinders mounted on one of said shafts, pistons in the cylinders connected to the other of said shafts, a valve in each cylinder, the walls of each cylinder having a passage way communicating with the atmosphere at one end and with said valve at the other end and the walls of said cylinder having another passage way communicating with said valve, storage means with which the latter passage communicates, and a check valve in each of the latter passage ways permitting a free flow through the latter passage ways in a direction away from the first named valve and allowing a restricted flow in the opposite direction.

12. A driving shaft, a driven shaft, a plurality of cylinders formed with a fly wheel, said fly wheel and cylinders being mounted on one of said shafts, pistons in the cylinders connected with the other of said shafts, storage means in communication with the cylinders, means including valves for controlling the circulation of fluid through the cylinders and storage means, and a band brake around said fly wheel.

13. A driving shaft, a driven shaft, cylinders connected to one of said shafts, pistons in the cylinders connected with the other shaft, a plate inserted in the cylinder walls, one face of the plate forming a surface in the cylinder, a circulation controlling valve in said plate close to said cylinder surface, a port in said plate leading from the valve to the interior of the cylinder, said plate having a lateral passage adapted to communicate with said port when said circulation controlling valve is in a certain position, a check valve between the said lateral passage, and a port formed in the plate between said check valve and the interior of the cylinder.

14. A driving shaft, a driven shaft, cylinders connected to one of said shafts, pistons in the cylinders connected with the other shaft, a plate inserted in the cylinder walls, one face of the plate forming a surface in the cylinder, a circulation controlling valve in said plate close to said cylinder surface, a port in said plate leading from the valve to the interior of the cylinder, said plate having a lateral passage adapted to communicate with said port when said circulation controlling valve is in a certain position, a check valve in the said lateral passage, a port formed in the plate between said check valve and the interior of the cylinder, storage means, and means for conducting fluid which escapes from the cylinder past said check valve to said storage means.

In testimony whereof, I have hereunto set my hand at Los Angeles, California, this 25th day of March, 1911.

FRANK MONROE PRATHER.

In presence of—
  G. T. HACKLEY,
  FRANK L. A. GRAHAM.